Oct. 28, 1941.  J. E. LINDEMAN  2,260,532
SHOCK ABSORBER
Filed June 28, 1939  2 Sheets-Sheet 1
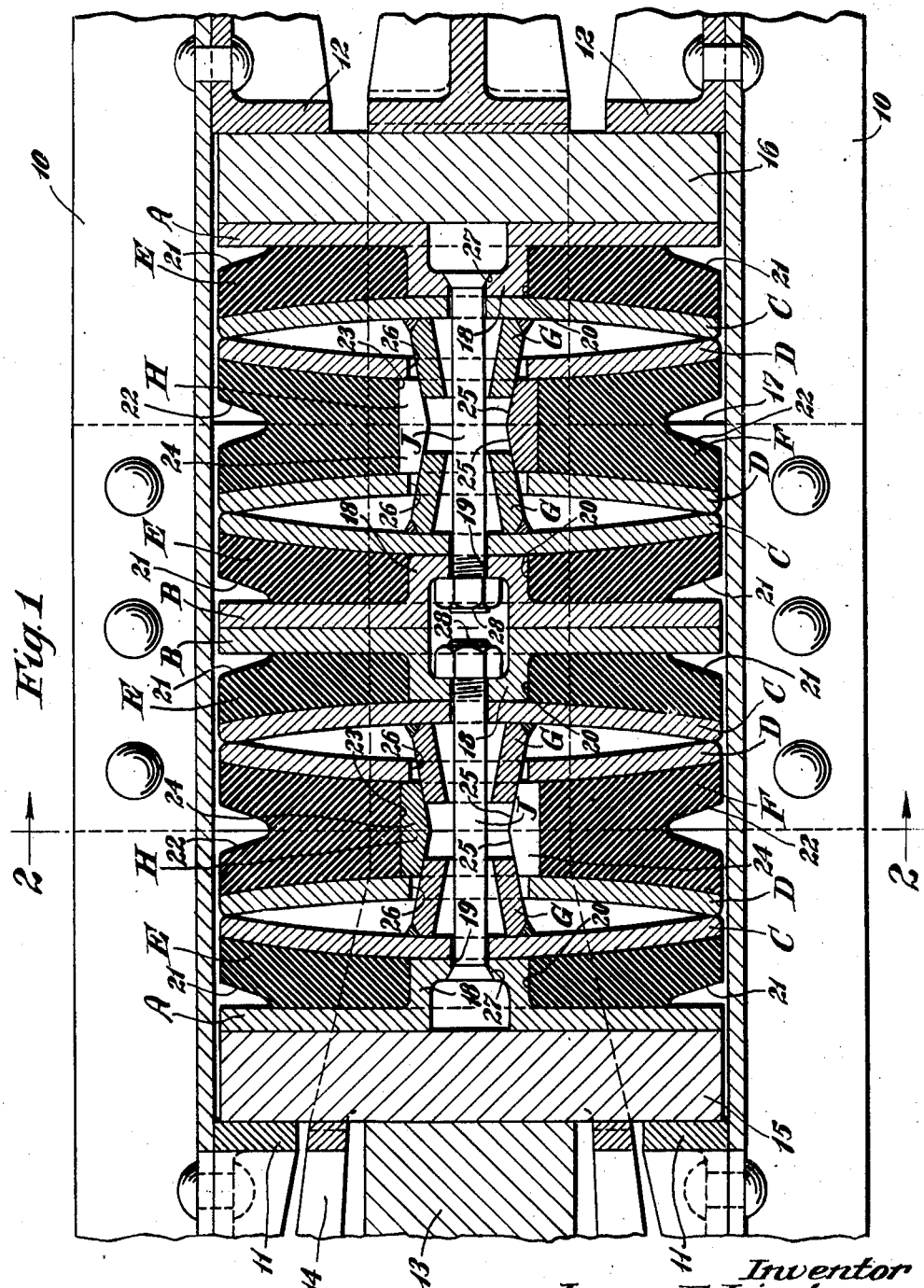
Inventor
James E. Lindeman
By Henry Fuchs
Atty.

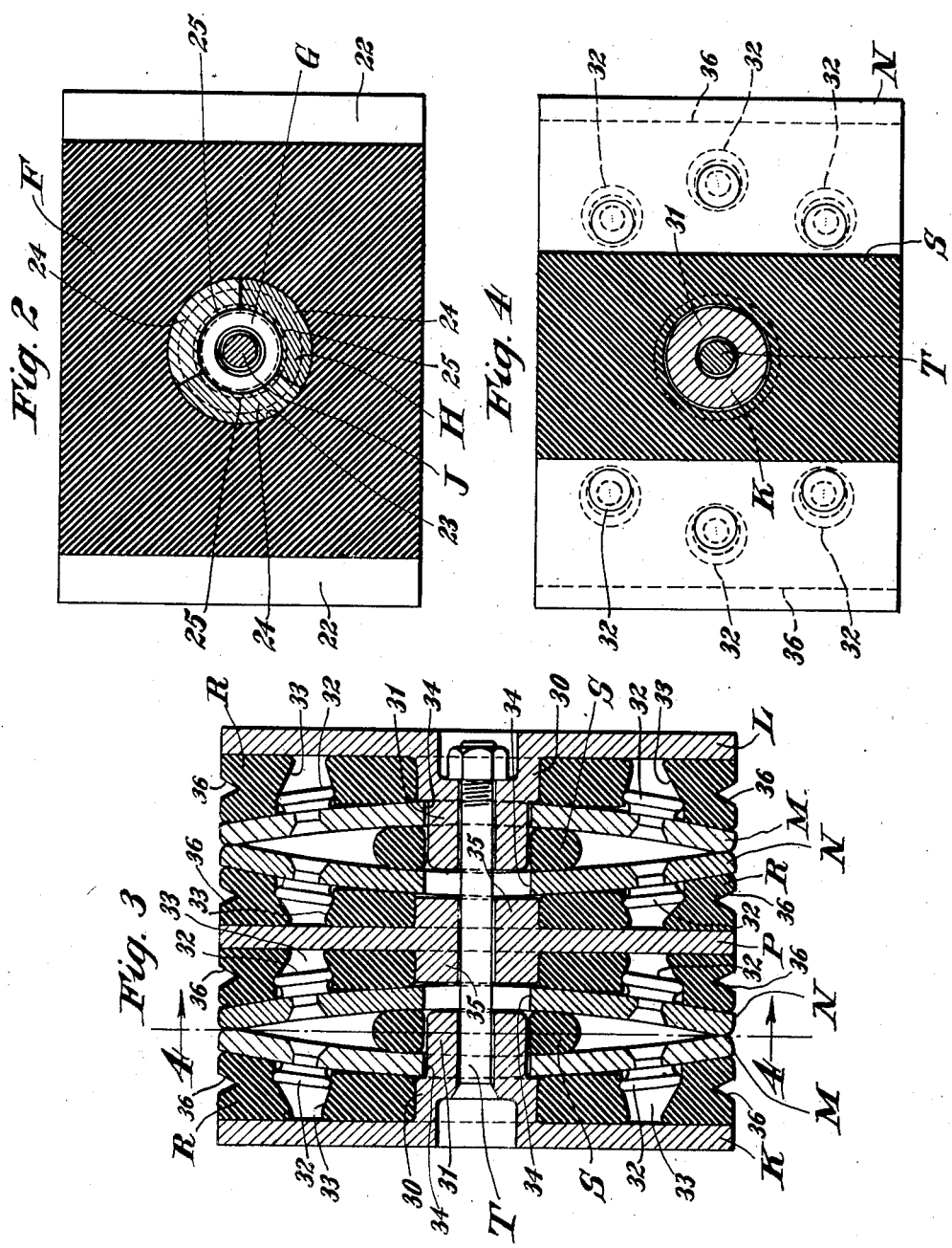

Patented Oct. 28, 1941

2,260,532

UNITED STATES PATENT OFFICE 2,260,532

SHOCK ABSORBER

James E. Lindeman, Evanston, Ill., assignor to W. H. Miner, Inc., Chicago, Ill., a corporation of Delaware Application June 28, 1939, Serial No. 281,521

11 Claims. (Cl. 213—40)

This invention relates to improvements in shock absorbers.

One object of the invention is to provide an efficient shock absorber especially adapted for railway draft riggings, comprising cushioning means composed of spring plates and rubber pads interposed between the spring plates, the spring plates being flexed and the rubber pads compressed therebetween during compression action of the device to absorb shocks.

Another object of the invention is to provide a shock absorber as set forth in the preceding paragraph wherein means is provided, operative during compression of the mechanism, for stretching the rubber pads transversely of the device, thus augmenting the shock absorbing capacity of said cushioning means.

A more specific object of the invention is to provide a shock absorber comprising one or more cushioning units, each composed of a plurality of bowed spring plates backed by rubber pads, wherein the plates are flattened out against said rubber pads during compression of the mechanism to absorb the shocks, the squeezing action exerted on the rubber pads by the plates serving to augment the resistance to compression offered by the spring action of said plates.

Other objects of the invention will more clearly appear from the description and claims hereinafter following.

In the drawings forming a part of this specification, Figure 1 is a horizontal longitudinal sectional view through a portion of the underframe structure at one end of a railway car, illustrating my improved shock absorber in connection therewith. Figure 2 is a transverse vertical sectional view, corresponding substantially to the line 2—2 of Figure 1, of my improved shock absorbing device only. Figure 3 is a view, similar to Figure 1, of one of the shock absorbing units only, illustrating another embodiment of the invention. Figure 4 is a transverse vertical sectional view, corresponding substantially to the line 4—4 of Figure 3.

Referring first to the embodiment of the invention illustrated in Figures 1 and 2, in said drawings, 10—10 indicate the longitudinally extending center or draft sills of a railway car underframe structure having the usual top and bottom flanges, the flanges at the bottom of the sills only being shown in Figure 1. On the inner sides the sills are provided with front and rear stop lugs 11—11 and 12—12 commonly employed in railway draft riggings. The rear end portion of the usual coupler shank is indicated by 13 to which is operatively connected a hooded yoke 14 of well-known construction. My improved shock absorbing mechanism and cooperating front and rear main followers 15 and 16 are disposed within the yoke, the followers 15 and 16 cooperating respectively with the front and rear stop lugs 11—11 and 12—12 in the usual manner. A saddle plate 17 secured to the bottom flanges of the sills 10—10 underlies the yoke 14 and supports the latter and the parts contained therein.

The improved shock absorber illustrated in Figures 1 and 2 comprises broadly front and rear cushioning units, each composed of two end follower plates A and B, four spring plates C—C and D—D, three rubber pads E—E and F, a pair of wedge members G—G, a sectional ring H, and a retainer bolt J.

The front and rear cushioning units are identical, but are reversely arranged as hereinafter explained.

The follower plates A and B are located at opposite ends of each unit. Each of these follower plates is preferably of rectangular outline and is provided with an inwardly projecting, hollow, cylindrical boss 18 provided with a central opening 19 adapted to accommodate the shank of the corresponding retainer bolt J.

The spring plates C—C and D—D and the rubber pads E—E and F of each unit are interposed between the follower plates A and B, as clearly shown in Figure 1.

The spring plates C and D are of similar design, except as hereinafter pointed out. Each of these plates is of substantially rectangular outline and transversely bowed or curved, as shown in Figure 1 of the drawings. The plates of each unit are arranged in pairs, each pair being composed of a plate C and a plate D, these plates having their concave sides opposed. The outer end portions of the plates of each pair have bearing engagement with each other at the sides of the mechanism.

The rubber pads E—E are arranged respectively at the front and rear ends of the corresponding unit and bear on the inner sides of the follower plates A and B, each pad being provided with a central opening 20 into which the boss 18 of the corresponding follower plate projects, and having flat face engagement with the follower plate. At the inner side each pad E bears on the plate C of the pair of plates at the corresponding end of the unit, said inner side of the pad presenting a concave surface to fit the convexity of said plate C. Each pad E is notched or cut away at opposite sides adjacent the corresponding follower plate, as indicated at 21—21, to provide for clearance for flow of the material thereof during compression of the same.

The rubber pad F is disposed centrally of the unit between the two pairs of plates C—D and C—D, in bearing engagement with the plates D—D of said pairs, and has the front and rear faces thereof concave to fit the convexity of the plates D—D. At opposite sides of the mechanism, the pad F is notched out or recessed, as indicated at 22—22, to permit flow of the material thereof during compression of said pad. The pad F is also further provided with a central opening 23 of substantially circular outline, which accommodates the sectional ring H.

The ring H which is seated in and fits the opening 23 of the pad F is preferably composed of three sections 24—24—24. Each section has front and rear interior wedge faces 25—25 which are transversely concave, the sectional ring thus presenting an interior opening which is tapered inwardly from opposite ends.

The wedge members G—G of each unit are preferably formed integral with the plates C—C of the unit and project from the inner sides of said plates and through openings 26—26 of the plates D—D into the opposite ends of the sectional ring H. Each wedge member G is in the form of a tubular element of frusto-conical shape welded to the corresponding plate C. Inasmuch as these wedge members are thus directly connected to the plates C—C, they are projected inwardly when the plates are flattened and withdrawn outwardly when the plates return to their bowed condition. The inner ends of these wedges are normally spaced apart as shown in Figure 1. The openings 26—26 of the plates D—D are of a size to provide clearance for the wedge members during all stages of the operation of the mechanism.

Each unit is held assembled and of overall uniform length by the corresponding retainer bolt J which extends through the openings 19—19 of the follower plates A and B, aligned openings in the plates C—C, the tubular wedges G—G, and the sectional ring H. The bolt is anchored to the follower plates A and B respectively by the head 27 and the nut 28 thereof. The head 27 of the bolt J is tapered, as shown, and seated in the outer end of the opening 19 of the follower A, the outer end of said opening being tapered, as shown, to provide a seat. The nut of the bolt is accommodated within the hollow boss of the plate B in shouldered engagement with the inner side of the end wall of said boss.

The operation of the improved shock absorber illustrated in Figures 1 and 2 is as follows: Upon a draft force being applied to the coupler 13 of the rigging, the follower 16 is pulled forwardly, thereby compressing the mechanism against the follower 15 which is held stationary at this time by the stop lugs 11—11. During buffing action of the rigging, the coupler is forced inwardly, carrying the front follower 15 therewith and compressing the mechanism against the rear follower 16, which at this time is held stationary by the stop lugs 12—12.

As the mechanism is compressed in either draft or buff, the bowed spring plates C—D of the two units of the absorber will be flattened out and the rubber pads E—E and F compressed, thereby offering yielding resistance to cushion the shocks. At the same time the wedge members G—G expand the rings H, thereby stretching or expanding the pad E, thus augmenting the yielding resistance offered by the flexing of the plates C—D and C—D and compression of the rubber pads.

The compression of the mechanism is limited by engagement of the conical wedge members G—G with each other, whereupon the force is transmitted directly through the follower plates A and B, the bosses of said plates, the plates C—C, and the wedge members G—G, from one main follower to the other, these parts acting as a solid column to transmit the load and relieve the spring plates C—D and the rubber pads E—E and F from undue compression.

When the actuating force is reduced, all of the parts of the device are restored to the normal full release position shown in Figure 1, by the expansive action of the rubber pads and the resiliency of the bowed spring plates, which plates tend to return to their maximum bowed condition shown in Figure 1.

Referring to the embodiment of the invention illustrated in Figures 3 and 4, the improved shock absorbing mechanism comprises a pair of units, only one of which is shown, applied to the draft rigging in the same manner as the units disclosed in Figure 1.

As shown in Figures 3 and 4, the unit comprises broadly two end follower plates K and L, four spring plates M—M and N—N, a central follower plate P, four rubber pads R—R—R—R, two rubber pads S—S, and a retainer bolt T.

The end follower plates K and L are similar to the follower plates A and B, hereinbefore described, with the exception that the central bosses of the plates K and L, which are indicated by 30—30, are longer than the bosses 18—18 and include cylindrical end portions 31—31 which are of reduced diameter.

The spring plates M—M and N—N are transversely bowed and are similar to the plates C—C and D—D, with the exception that the plates M—M and N—N are provided with knobs 32—32 which are spaced about the center of each of the plates and engage in the openings 33—33 in the adjacent pad R, and that the plates are further provided with central openings 34—34 adapted to freely accommodate the reduced portions 31—31 of the bosses 30—30.

The central or intermediate follower P is substantially flat, as shown, and has oppositely projecting central bosses 35—35 which engage within openings provided in the adjacent rubber pads R—R which are disposed on opposite sides of this follower plate and have on their inner sides flat surface engagement therewith. At the outer sides these pads bear on the adjacent plates N—N of the two pairs, and have curved bearing engagement therewith. To permit flow of the rubber material of the pads R—R, the latter are notched or cut out at opposite sides of the mechanism, as indicated at 36—36. The remaining rubber pads R—R are in all respects similar to the two pads R—R just described, and are interposed between the plates M—M of the pairs of spring plates and the end follower plates K and L. The two pads R—R, which bear on the end follower plates, have central openings accommodating the larger diameter portions of the bosses 30—30 of the follower plates.

The two rubber pads S—S are of similar design, one of said pads being associated with each pair of spring plates M—N. Each pad S is interposed between the concave sides of the plates M and N of the corresponding pair, and is provided with a central opening freely accommodating the reduced portion 31 of the boss 30 of the corresponding follower plate.

The retainer bolt T serves to hold the mechanism assembled and of uniform overall length in the same manner as the bolt J described in connection with Figures 1 and 2.

In compression of the unit shown in Figures 3 and 4, the follower plates K and L are forced toward each other, thereby compressing the rubber pads R—R—R—R and flexing the spring plates M—M and N—N to flatten the latter. As the plates M—N are flattened, they are elongated transversely, thus increasing the distance between the knobs 32—32 and the central longitudinal axis of the device, causing the rubber pads R—R—R—R to be stretched, thus augmenting the cushioning effect. As the spring plates M—N of each pair are flattened out, the rubber pad S located therebetween is also flattened.

Compression of the unit is limited by the reduced ends 31—31 of the bosses 30—30 coming into engagement with the bosses 35—35 of the intermediate follower plate P, whereupon the forces are transmitted directly through these bosses 30—30 and 35—35, the same together with the follower plates acting as a solid column to take the load and relieve the spring plates and rubber pads from excessive compression.

The parts are restored to the normal free release position when the actuating force is reduced, by the expansive action of the rubber pads and the tendency of the spring plates to return to the flexed condition.

I have herein shown and described what I now consider the preferred manner of carrying out my invention, but the same is merely illustrative and I contemplate all changes and modifications that come within the scope of the claims appended hereto.

I claim:

1. A shock absorber including a plurality of transversely disposed rubber pads and transversely curved spring plates, said plates being arranged in pairs of adjacent plate members, the members of each pair being curved reversely with respect to each other and having their concave sides facing each other with their outer edges in bearing contact with each other throughout the entire compression stroke of the mechanism, said plates of each pair having their convex sides bearing on said rubber pads.

2. A shock absorber including a plurality of transversely disposed rubber pads and spring plates, said spring plates being arranged in pairs of adjacent plate members, the members of each pair being in bearing contact with each other at their opposite side edges and bowed away from each other between said side edges, said plate members of each pair having bearing contact with each other at said opposite side edges throughout the compression stroke of the mechanism, said pads being alternated with said pairs of plates.

3. A shock absorber including a plurality of transversely arranged rectangular rubber pads, and curved rectangular spring plates interposed between said pads, said plates being arranged in pairs between adjacent pads with the concave sides of the members of each pair facing each other and with their outer side edges in bearing contact with each other throughout the compression stroke of the mechanism.

4. In a shock absorber, the combination with end follower plates; of a plurality of pairs of transversely bowed spring plates, the plates of each pair being bowed away from each other between their side edges, said plates of each pair having contact with each other at said side edges during the entire compression stroke of the mechanism and a plurality of rubber pads alternated with said pairs of spring plates, said pads having concave faces engaged with the corresponding sides of said plates, said spring plates and rubber pads being interposed between said follower plates with certain of said pads in bearing contact with said follower plates.

5. In a shock absorber, the combination with a transversely disposed rubber pad of transversely disposed bowed spring plates bearing on the front and rear sides of said pad, said plates having their convex sides bearing on said pad; a transversely disposed bowed spring plate in contact with each of said first named spring plates throughout the entire compression stroke of the mechanism, said contacting plates having their concave sides facing each other; a transversely disposed rubber pad bearing on each of said second named spring plates at each end of the device; and end follower plates bearing on said last named rubber pads.

6. A shock absorber including a transversely disposed rubber pad, a transversely disposed spring plate bearing against said pad, pressure transmitting means and abutment means between which said pad and plate are compressed and means for stretching said pad in lateral direction while being compressed by the pressure of said plate thereon.

7. A shock absorber including a transversely disposed bowed spring plate, a transversely disposed rubber pad against which said spring plate is buttressed, pressure transmitting means for pressing said plate against said pad to compress the latter, and means engaged in said rubber pad and actuated driving compression of said shock absorber for stretching the same in a direction normal to the compression force acting on said shock absorber.

8. A shock absorber including a plurality of transversely disposed rubber pads, a plurality of pairs of transversely disposed bowed spring plates, said plates being alternated with said pads, wedge means cooperating with at least one of said pads for stretching the same in a direction normal to the force applied to said shock absorber and pressure transmitting means for compressing said pads and plates and actuating said wedge means.

9. In a shock absorber, the combination with end follower plates; of a rubber pad bearing on each follower plate; an intermediate transversely disposed rubber pad having a central opening; a sectional ring in said opening; wedge members actuated by said follower plates and cooperating with said sectional ring for expanding the same and stretching the rubber pad; and transversely bowed spring plates interposed between said rubber pads and said intermediate rubber pad.

10. A shock absorber including a plurality of transversely bowed spring plates adapted to be flattened under pressure, and rubber pads against which said plates are buttressed, said plates having laterally spaced, projecting knobs thereon imbedded in said pads, to stretch said pads upon flattening out of said plates in compression of said shock absorber.

11. In a shock absorber, the combination with end follower plates; of a central rubber pad between said follower plates, said pad having a central opening; an expandible sectional ring within said opening; rubber pads at opposite ends of the shock absorber bearing on the inner sides of said plates respectively; and a spring cushioning unit interposed between each end pad and the central pad, each spring unit comprising a pair of transversely disposed metal spring plates bearing respectively on said central pad and the corresponding end pad, the plates of said pair being bowed away from each other between their transverse extremities, the plate of said pair which bears on the end follower plate having a central wedge projection thereon extending through the other plate of said pair and engaging within the sectional ring of the central pad to expand said ring and transversely stretch said central pad when said wedge is forced into said ring.

JAMES E. LINDEMAN.